US012785331B2

(12) United States Patent
Hsu et al.

(10) Patent No.: US 12,785,331 B2
(45) Date of Patent: Nov. 3, 2026

(54) BOARD-TO-BOARD CONNECTOR WITH IMPROVED GROUNDING ISOLATION SHEET

(71) Applicant: Luxshare Precision Industry Company Limited, Shenzhen (CN)

(72) Inventors: Chien-Yu Hsu, Shenzhen (CN); Hui-Hsueh Chiang, Shenzhen (CN); Chi-Wei Lin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 343 days.

(21) Appl. No.: 18/663,977

(22) Filed: May 14, 2024

(65) Prior Publication Data

US 2025/0183595 A1 Jun. 5, 2025

(30) Foreign Application Priority Data

Dec. 5, 2023 (CN) ........................ 202311668338.X

(51) Int. Cl.
*H01R 13/6585* (2011.01)
*H01R 12/71* (2011.01)

(52) U.S. Cl.
CPC ....... *H01R 13/6585* (2013.01); *H01R 12/716* (2013.01)

(58) Field of Classification Search
CPC .............. H01R 12/7082; H01R 12/714; H01R 12/716; H01R 12/73; H01R 13/2435; H01R 13/6461; H01R 13/6585; H01R 13/6594; H01R 13/6597
USPC ............................................................ 439/66
See application file for complete search history.

(56) References Cited

U.S. PATENT DOCUMENTS 4,655,519 A * 4/1987 Evans .................. H05K 7/1069 439/514
4,927,369 A * 5/1990 Grabbe ................ H01R 12/714 439/82
7,128,622 B2 * 10/2006 Tsai .................. H01R 12/7076 439/83
7,254,889 B1 * 8/2007 Cherian ............... G01R 1/0466 324/755.05

(Continued)

FOREIGN PATENT DOCUMENTS

CN 1808790 A 7/2006
CN 104577388 A 4/2015

(Continued)

*Primary Examiner* — Abdullah A Riyami
*Assistant Examiner* — Thang H Nguyen
(74) *Attorney, Agent, or Firm* — Birch, Stewart, Kolasch & Birch, LLP

(57) ABSTRACT

A board-to-board connector includes an insulating body, a number of conductive terminals and a grounding isolation sheet. The grounding isolation sheet includes a first grounding isolation sheet and a second grounding isolation sheet. The first grounding isolation sheet includes a first base portion, a first connecting arm and a first grounding elastic arm. The first grounding elastic arm includes a first engaging portion. The second grounding isolation sheet includes a second base portion, a second connecting arm and a second grounding elastic arm. The second grounding elastic arm includes a second engaging portion. The first connecting arm is in contact with the second connecting arm.

20 Claims, 23 Drawing Sheets

(56) References Cited

U.S. PATENT DOCUMENTS

| | | | | |
|---|---|---|---|---|
| 2007/0287315 | A1* | 12/2007 | Kubo | H01R 13/2435 439/259 |
| 2024/0055806 | A1* | 2/2024 | Lin | H01R 13/518 |
| 2026/0011942 | A1* | 1/2026 | Hsu | H01R 12/714 |

FOREIGN PATENT DOCUMENTS

| | | | | | |
|---|---|---|---|---|---|
| CN | 205944503 | U | | 2/2017 | |
| CN | 206864775 | U | | 1/2018 | |
| CN | 109546383 | A | | 3/2019 | |
| CN | 109560406 | A | * | 4/2019 | H01R 12/57 |
| CN | 110416789 | A | | 11/2019 | |
| CN | 218385850 | U | | 1/2023 | |
| CN | 116131033 | A | | 5/2023 | |
| CN | 116435807 | A | | 7/2023 | |
| CN | 116667013 | A | | 8/2023 | |
| KR | 10-2022-0122010 | A | | 9/2022 | |
| TW | M283410 | U | | 12/2005 | |
| TW | M642407 | U | | 6/2023 | |

* cited by examiner

BOARD-TO-BOARD CONNECTOR WITH IMPROVED GROUNDING ISOLATION SHEET

CROSS-REFERENCE TO RELATED APPLICATION

This patent application claims priority of a Chinese Patent Application No. 202311668338.X, filed on Dec. 5, 2023 and titled "BOARD-TO-BOARD CONNECTOR", the entire content of which is incorporated herein by reference.

TECHNICAL FIELD

The present disclosure relates to a board-to-board connector, which belongs to the technical field of connectors.

BACKGROUND

Board-to-board connectors in the related art generally include an insulating body and a plurality of conductive terminals fixed in the insulating body. Each conductive terminal includes a first contact elastic arm extending beyond the insulating body and a second contact elastic arm extending beyond the insulating body. The first contact elastic arm is configured to abut against a first circuit board to achieve electrical connection. The second contact elastic arm is configured to abut against a second circuit board to achieve electrical connection.

With the continuous improvement of signal transmission requirements for board-to-board connectors, how to reduce crosstalk between signals is a technical problem to be solved by those skilled in the art.

For this reason, it is proposed in the related art to add a grounding isolation sheet between adjacent conductive terminals. However, considering issues such as terminal density and structural strength of the insulating body, how to optimize the grounding isolation sheet is a technical problem that those skilled in the art need to solve.

SUMMARY

An object of the present disclosure is to provide a board-to-board connector with an optimized structure of a grounding isolation sheet.

In order to achieve the above object, the present disclosure adopts the following technical solution: a board-to-board connector, including: an insulating body including a first mounting surface and a second mounting surface opposite to the first mounting surface; a plurality of conductive terminals disposed in at least a first row and a second row; the first row and the second row being spaced apart along a first direction; each conductive terminal including a first contact elastic arm extending beyond the first mounting surface, and a second contact elastic arm extending beyond the second mounting surface; and a grounding isolation sheet located between the conductive terminals of the first row and the conductive terminals of the second row; the grounding isolation sheet including a first grounding isolation sheet and a second grounding isolation sheet; wherein the first grounding isolation sheet includes a first base portion mounted in the insulating body, a first connecting arm extending from the first base portion, and a first grounding elastic arm extending from the first base portion; the first grounding elastic arm includes a first engaging portion protruding beyond the first mounting surface; the second grounding isolation sheet includes a second base portion mounted in the insulating body, a second connecting arm extending from the second base portion, and a second grounding elastic arm extending from the second base portion; the second grounding elastic arm includes a second engaging portion protruding beyond the second mounting surface; the first connecting arm is in contact with the second connecting arm so as to connect the first grounding isolation sheet and the second grounding isolation sheet in series.

Compared with the prior art, the grounding isolation sheet of the present disclosure includes a first grounding isolation sheet and a second grounding isolation sheet. The first grounding isolation sheet includes a first connecting arm and a first grounding elastic arm. The first grounding elastic arm is configured to abut against a first circuit board. The second grounding isolation sheet includes a second connecting arm and a second grounding elastic arm. The second grounding elastic arm is configured to abut against a second circuit board. The first connecting arm is in contact with the second connecting arm so as to connect the first grounding isolation sheet and the second grounding isolation sheet in series. In this way, the grounding isolation sheet of the present disclosure improves the grounding effect when it comes into contact with the first circuit board and the second circuit board by providing the first grounding elastic arm and the second grounding elastic arm. Besides, the first grounding isolation sheet and the second grounding isolation sheet, which are provided separately, facilitate assembly.

DETAILED DESCRIPTION

Figure 1:
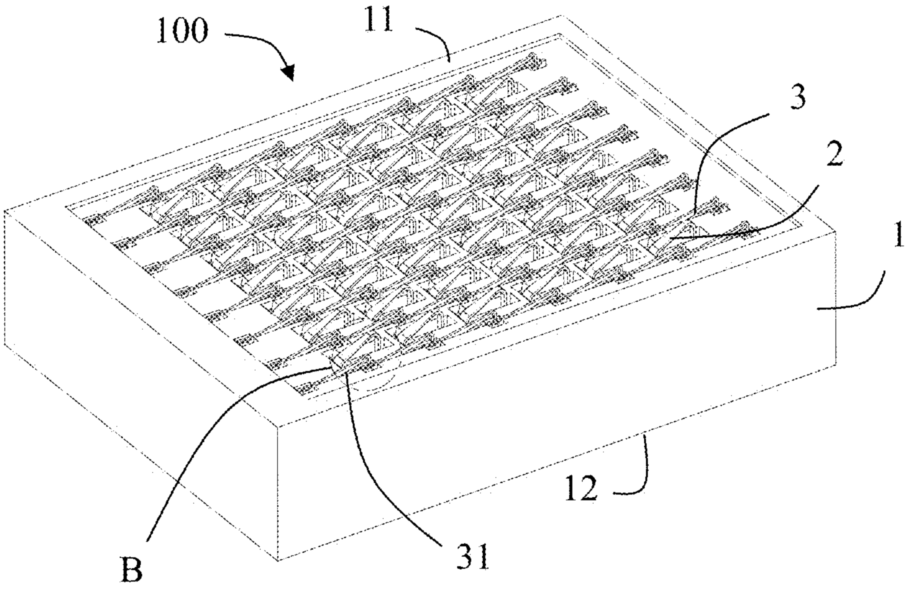
FIG. 1 is a schematic perspective view of a board-to-board connector in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 29, the present disclosure discloses a board-to-board connector 100 which includes an insulating body 1, a plurality of conductive terminals 2 and at least one grounding isolation sheet 3.

Referring to FIG. 1, FIG. 3, FIG. 7 and FIG. 9, the insulating body 1 includes a first mounting surface 11 (for example, an upper surface) and a second mounting surface 12 (for example, a lower surface) opposite to the first mounting surface 11. In the illustrated embodiment of the present disclosure, the insulating body 1 further includes a plurality of terminal mounting grooves 13 that extend through the first mounting surface 11 and the second mounting surface 12 along a top-bottom direction. In addition, the insulating body 1 further includes a plurality of first mounting grooves 14 extending upwardly through the first mounting surface 11, a plurality of second mounting grooves 15 extending downwardly through the second mounting surface 12, at least one connecting groove 16 connecting a corresponding first mounting groove 14 and a corresponding second mounting groove 15, and at least one reinforced portion 17 located between the first mounting groove 14 and the second mounting groove 15. In the illustrated embodiment of the present disclosure, a plurality of reinforced portions 17 are provided, and each reinforced portion 17 is located between two adjacent connecting grooves 16. It is understandable to those skilled in the art that the reinforced portions 17 are inner walls of the insulating body 1.

Figure 5:
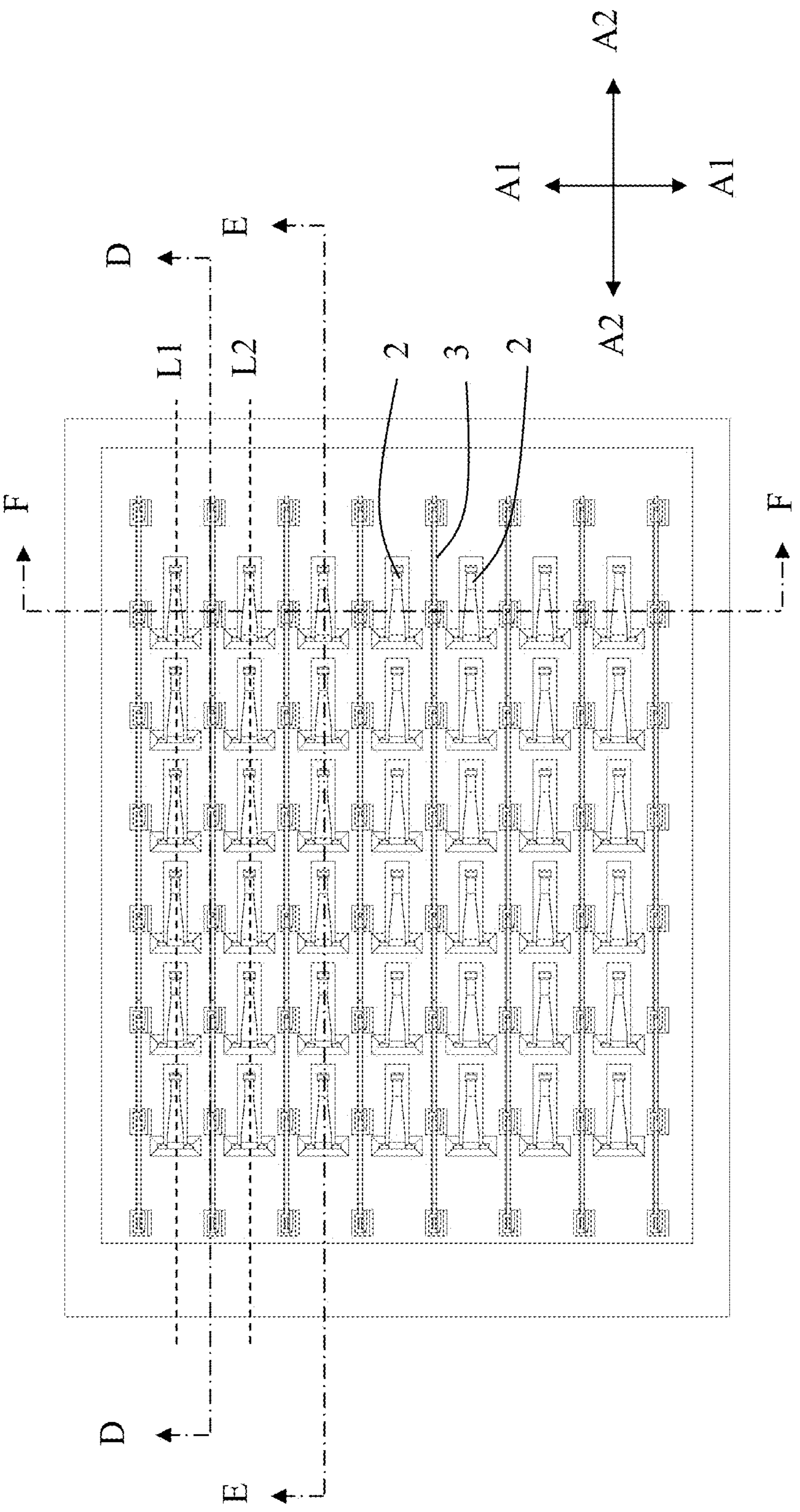
FIG. 5 is a top view of FIG. 1.
Figure 6:
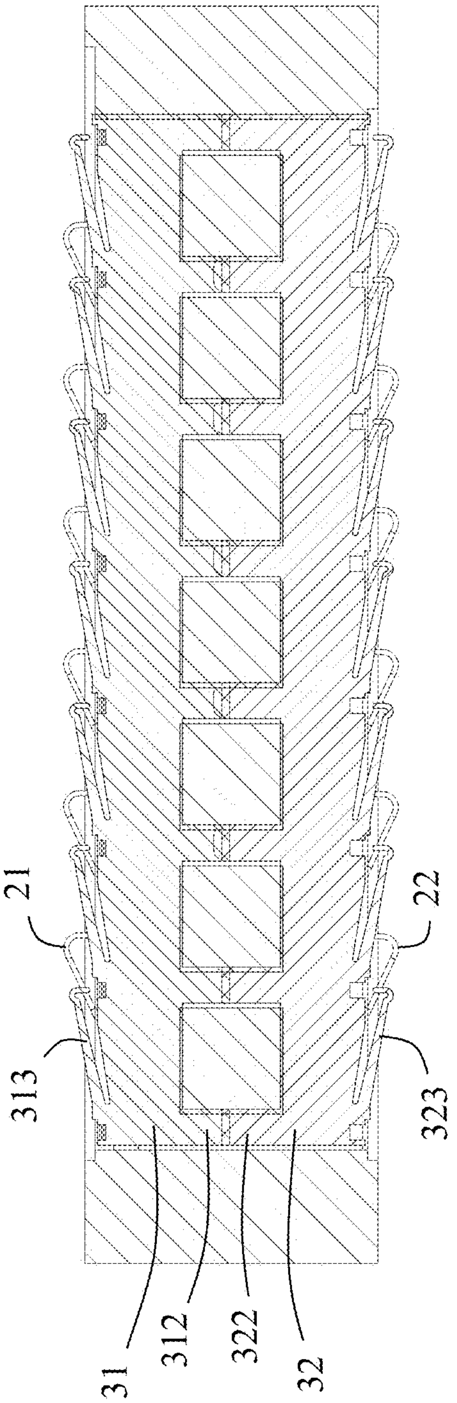
FIG. 6 is a schematic cross-sectional view taken along line D-D in FIG. 5.
Figure 9:
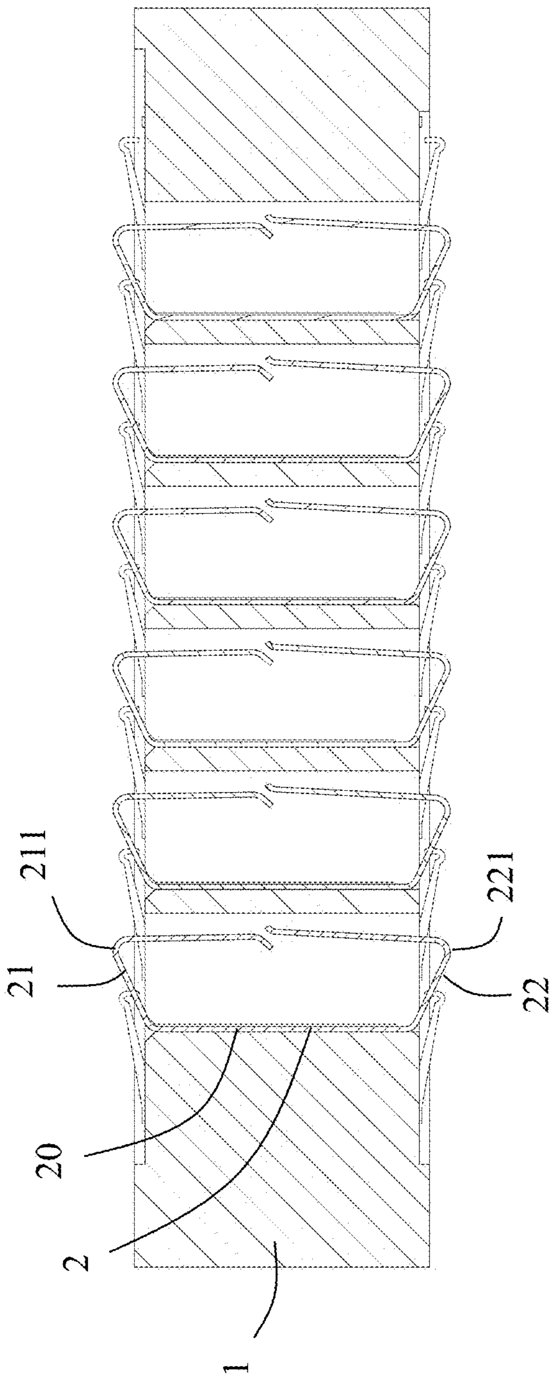
FIG. 9 is a schematic cross-sectional view taken along line E-E in FIG. 5.
Figure 19:
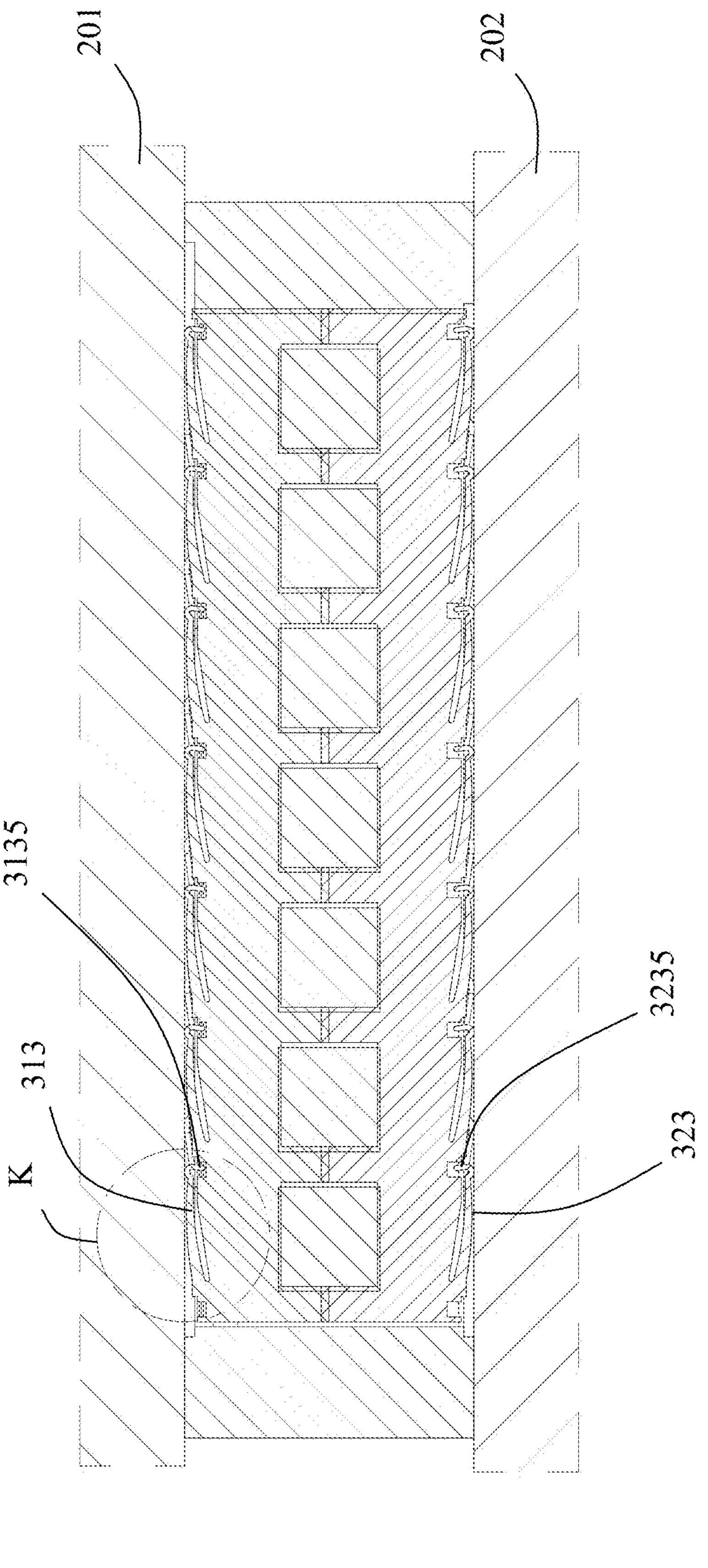
FIG. 19 is a schematic cross-sectional view taken along line J-J in FIG. 15, in which the first circuit board and the second circuit board are schematically shown.
Figure 20:
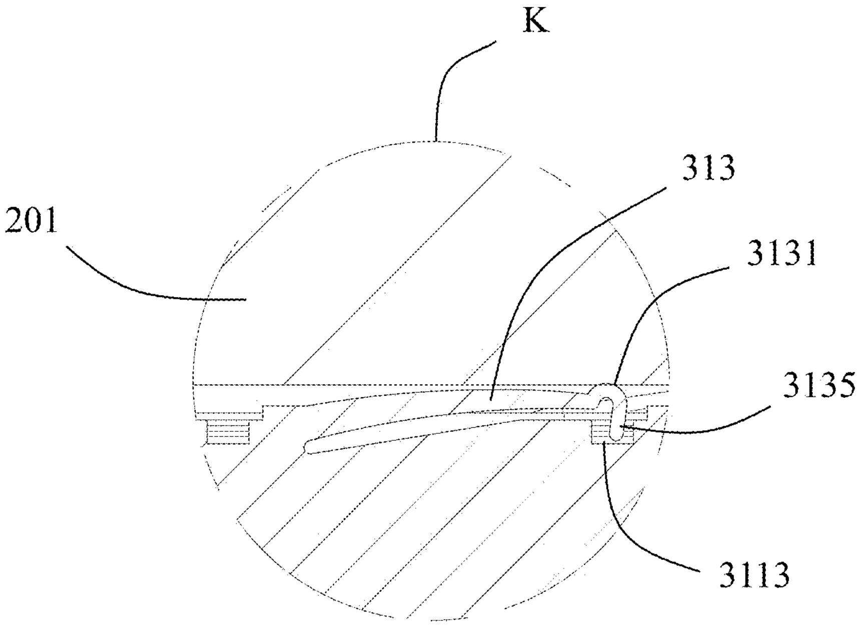
FIG. 20 is a partial enlarged view of a circled portion K in FIG. 19.
Figure 21:
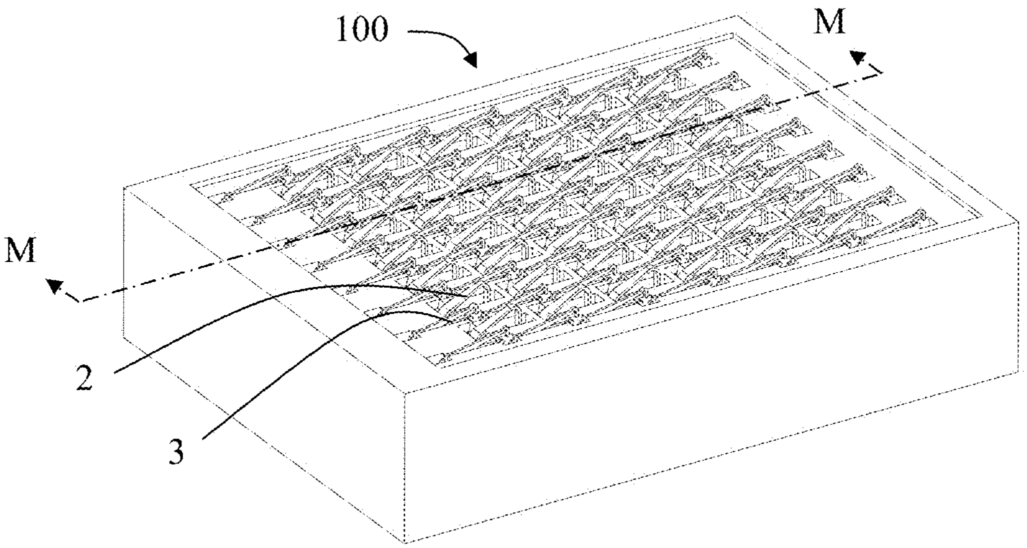
FIG. 21 is a perspective view of a board-to-board connector in accordance with a second embodiment of the present disclosure.
Figure 22:
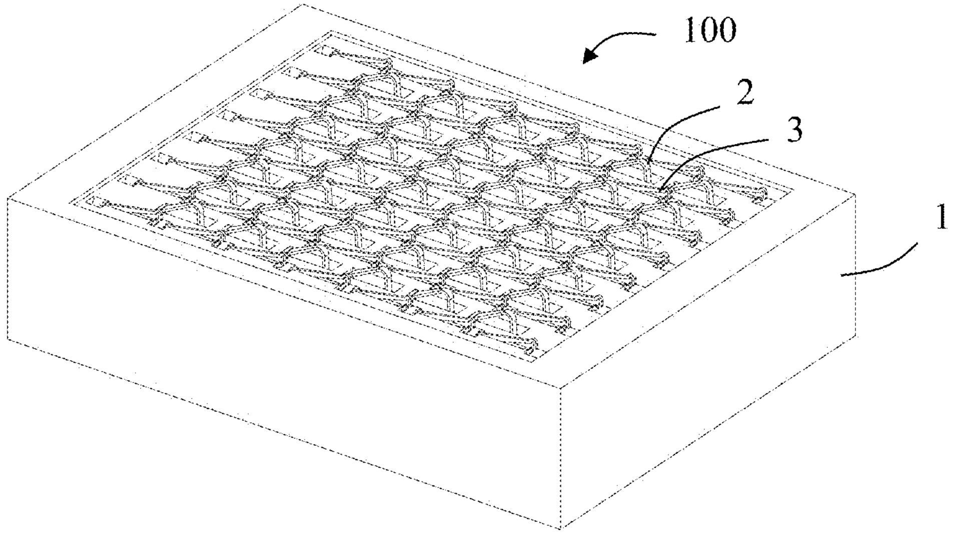
FIG. 22 is a perspective view of FIG. 21 from another angle.
Figure 23:
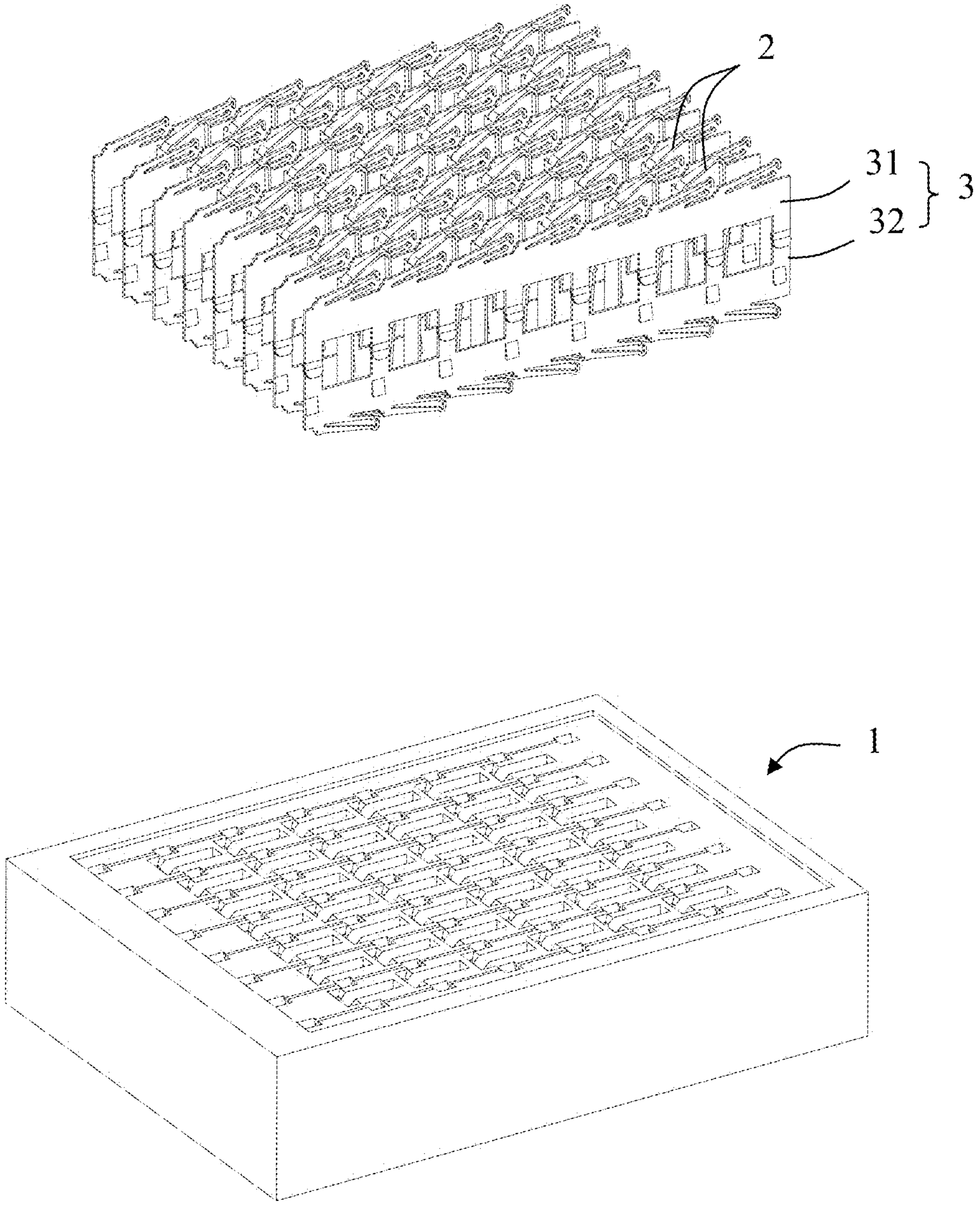
FIG. 23 is a partially exploded perspective view of FIG. 21.
Figure 24:
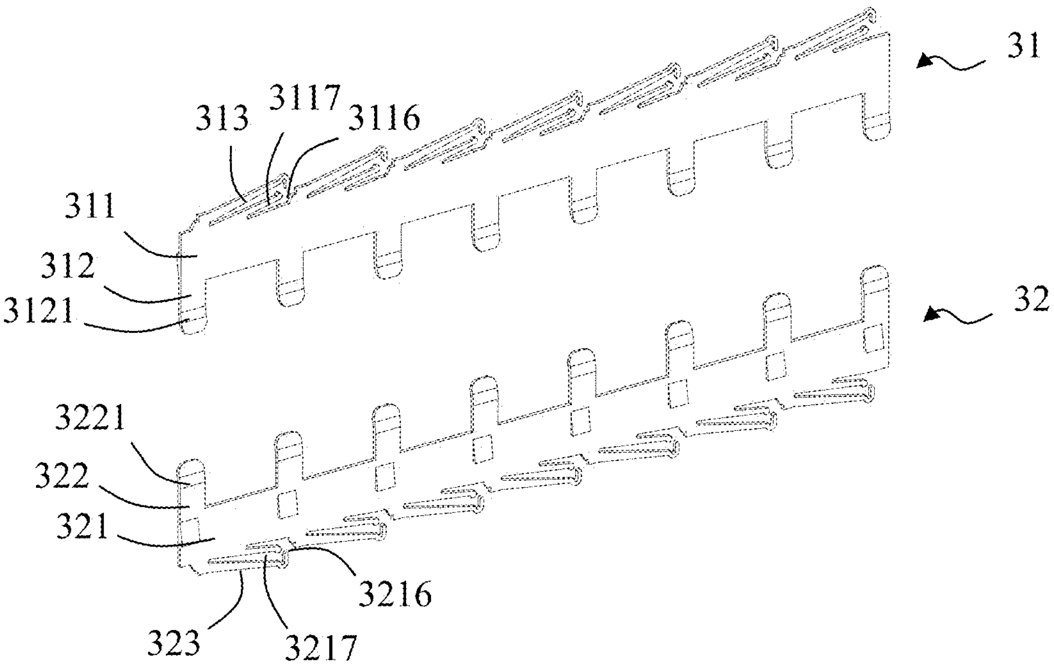
FIG. 24 is an exploded perspective view of a first grounding isolation sheet and a second grounding isolation sheet in FIG. 23.
Figure 25:
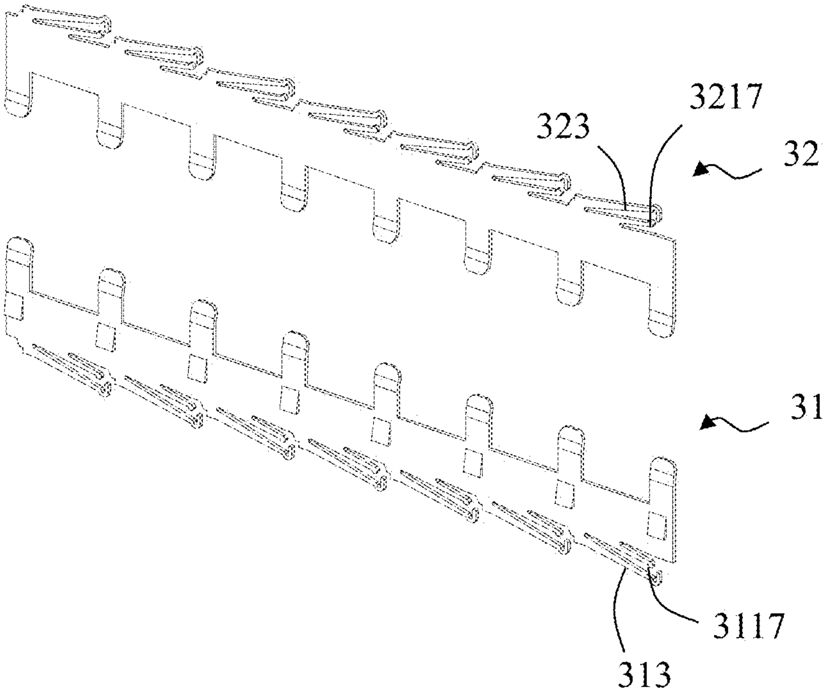
FIG. 25 is an exploded perspective view of FIG. 24 from another angle.
Figure 26:
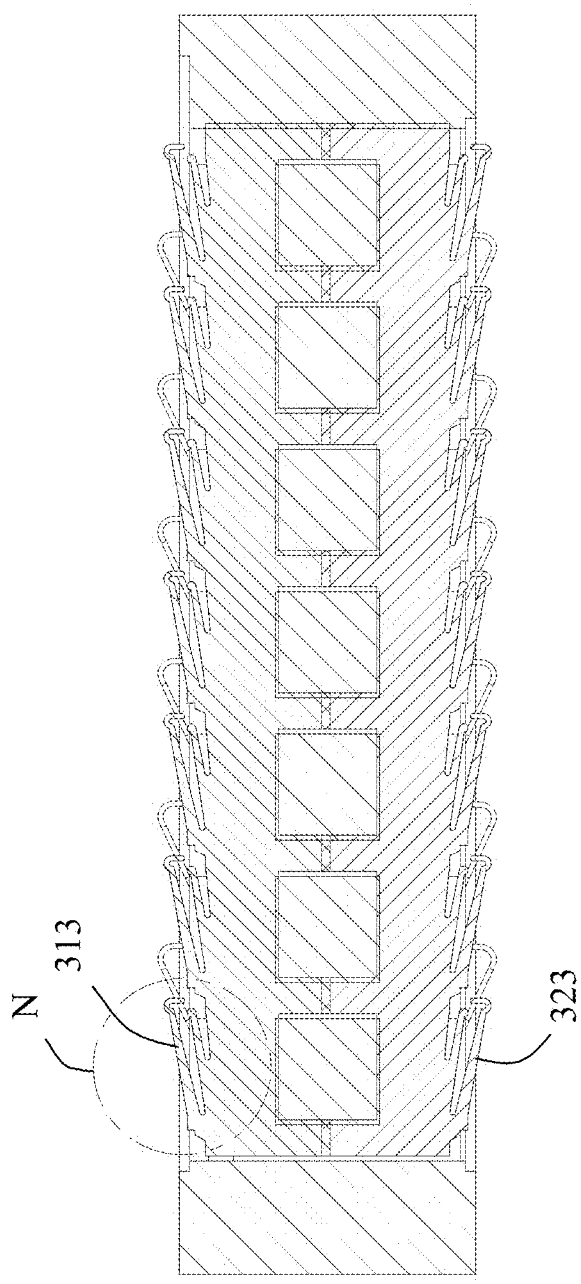
FIG. 26 is a schematic cross-sectional view taken along line M-M in FIG. 21, in which the board-to-board connector is not in contact with a first circuit board and a second circuit board.
Figure 27:
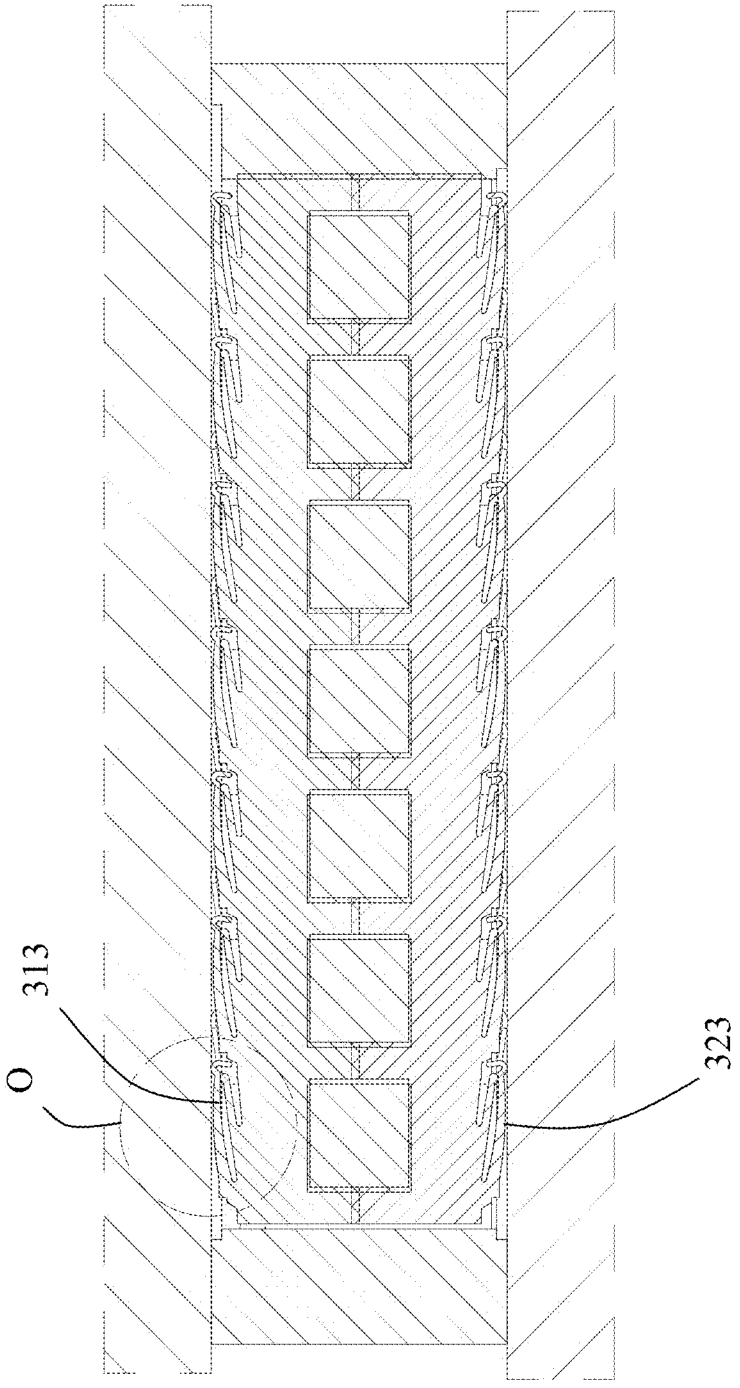
FIG. 27 is a schematic cross-sectional view taken along line M-M in FIG. 21, in which the board-to-board connector is in contact with the first circuit board and the second circuit board.
Figure 28:
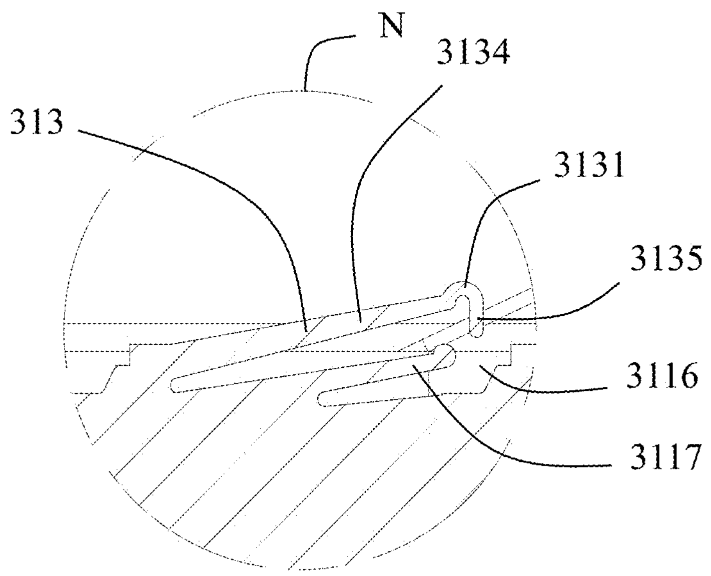
FIG. 28 is a partial enlarged view of a circled portion N in FIG. 26.
Figure 29:
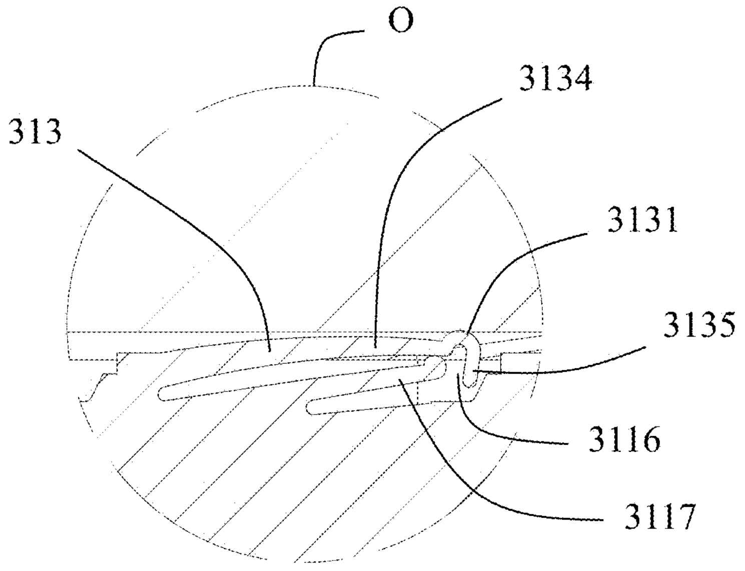
FIG. 29 is a partial enlarged view of a circled portion O in FIG. 27.
Figure 30:
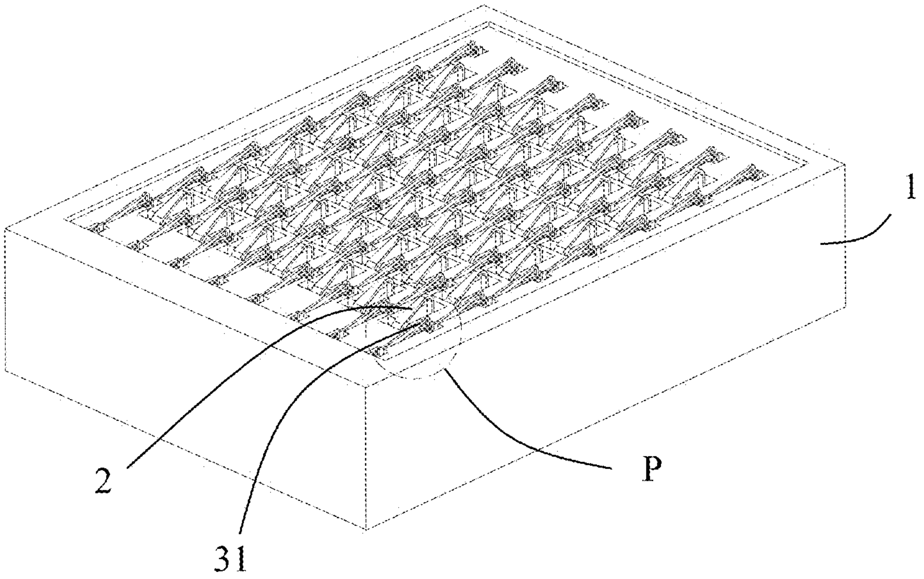
FIG. 30 is a perspective view of a board-to-board connector in accordance with a third embodiment of the present disclosure.
Figure 31:
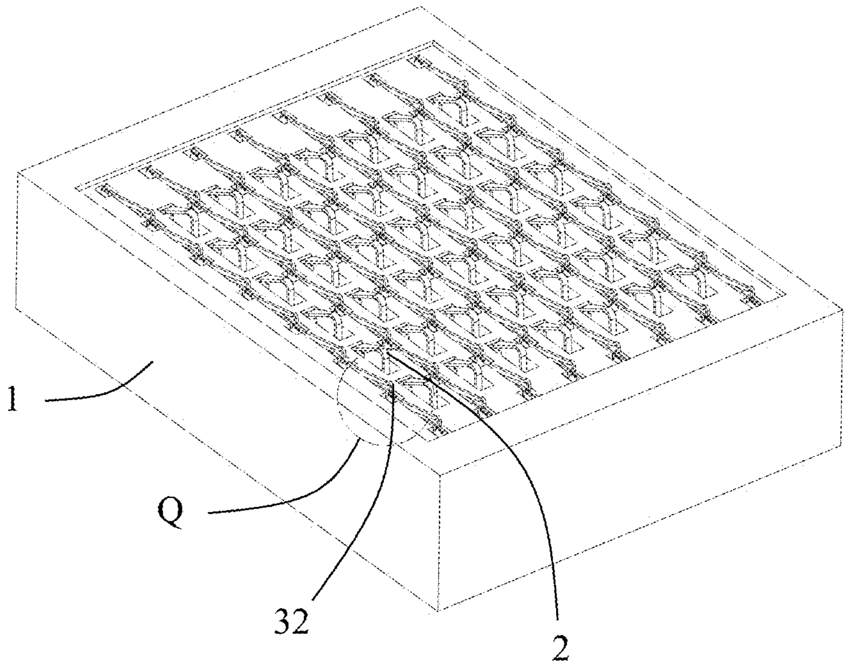
FIG. 31 is a perspective view of FIG. 30 from another angle.
Figure 32:
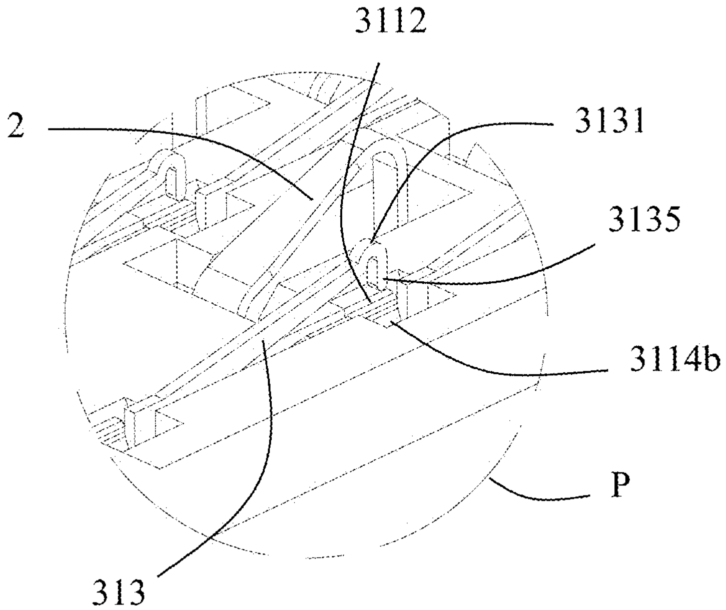
FIG. 32 is a partial enlarged view of a circled portion P in FIG. 30.
Figure 33:
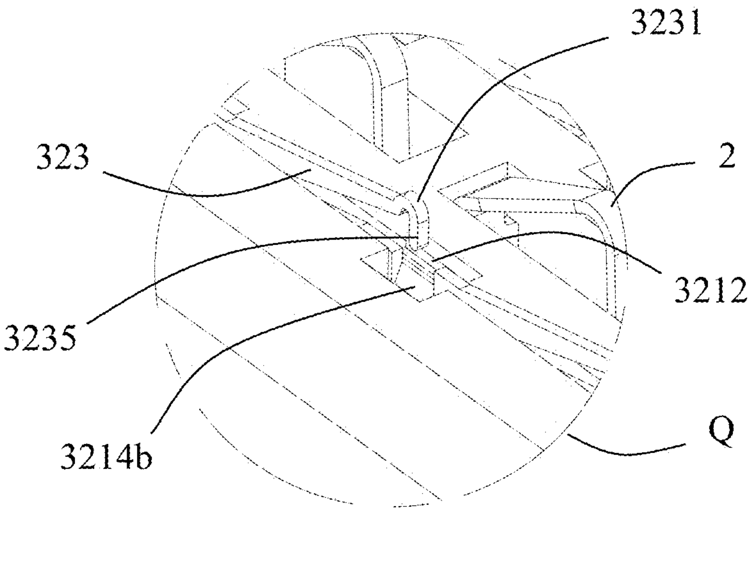
FIG. 33 is a partial enlarged view of a circled portion Q in FIG. 31.
Figure 34:
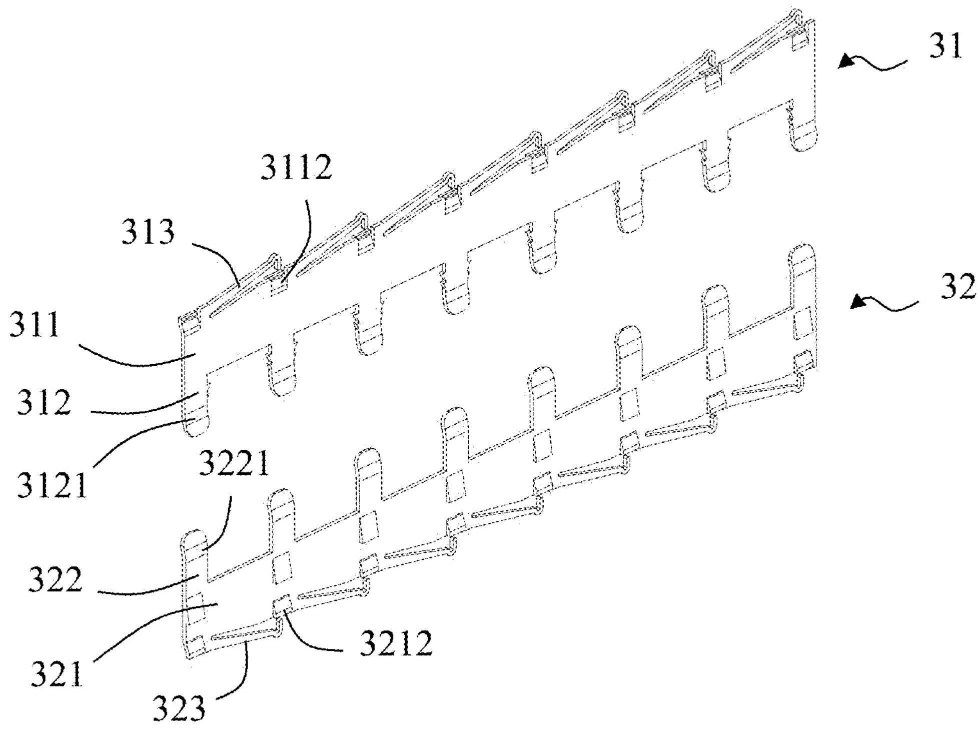
FIG. 34 is an exploded perspective view of a first grounding isolation sheet and a second grounding isolation sheet in FIG. 30.
Figure 35:
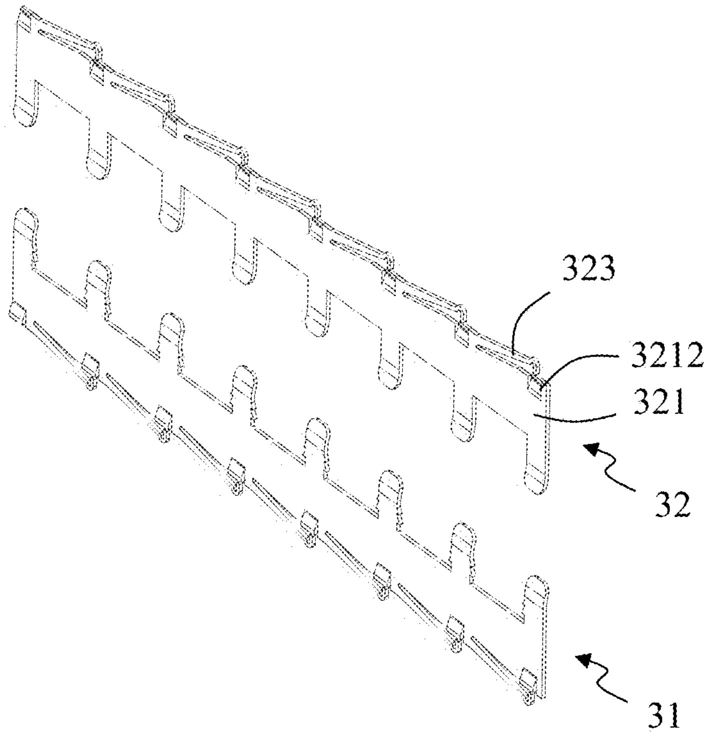
FIG. 35 is an exploded perspective view of FIG. 34 from another angle.

As shown in FIG. 5 and FIG. 9, the plurality of conductive terminals 2 are disposed in at least a first row L1 and a second row L2. The first row L1 and the second row L2 are spaced apart along a first direction A1-A1 (for example, a left-right direction). It is understandable to those skilled in the art that the first row L1 and the second row L2 may be two adjacent rows close to each other along the first direction A1-A1 or two rows distant from each other. In the illustrated embodiment of the present disclosure, the first row L1 and the second row L2 are two adjacent rows close to each other along the first direction A1-A1. Each conductive terminal 2 includes a fixing portion 20 fixed in the terminal mounting groove 13, a first contact elastic arm 21 extending beyond the first mounting surface 11 and a second contact elastic arm 22 extending beyond the second mounting surface 12. As shown in FIG. 9 and FIG. 19, the first contact elastic arm 21 includes a first contact portion 211 configured to abut against a first circuit board 201. The second contact elastic arm 22 includes a second contact portion 221 configured to abut against a second circuit board 202.

In the illustrated embodiment of the present disclosure, the plurality of conductive terminals 2 are disposed in matric along the first direction A1-A1 and along a second direction A2-A2 (for example, a front-rear direction) perpendicular to the first direction A1-A1 to improve signal transmission capability. The first row L1 and the second row L2 both extend along the second direction A2-A2.

Referring to FIGS. 5 to 14, in the illustrated embodiment of the present disclosure, a plurality of grounding isolation sheets 3 are provided, and each grounding isolation sheet 3 is located between two adjacent rows of the plurality of conductive terminals 2 along the first direction A1-A1 to improve shielding. The following description only takes the grounding isolation sheet 3 located between the conductive terminals 2 of the first row L1 and the conductive terminals 2 of the second row L2 as an example.

In the illustrated embodiment of the present disclosure, the grounding isolation sheet 3 includes a first grounding isolation sheet 31 and a second grounding isolation sheet 32 which are two separated components. In the illustrated embodiment of the present disclosure, the first grounding isolation sheet 31 and the second grounding isolation sheet 32 are both metal sheets. Preferably, the first grounding isolation sheet 31 and the second grounding isolation sheet 32 are shared components, that is, the first grounding isolation sheet 31 and the second grounding isolation sheet 32 have the same structure, and only have different installation angles. For example, the second grounding isolation sheet 32 is formed by inverting the first grounding isolation sheet 31 by 180°, and vice versa.

Figure 7:
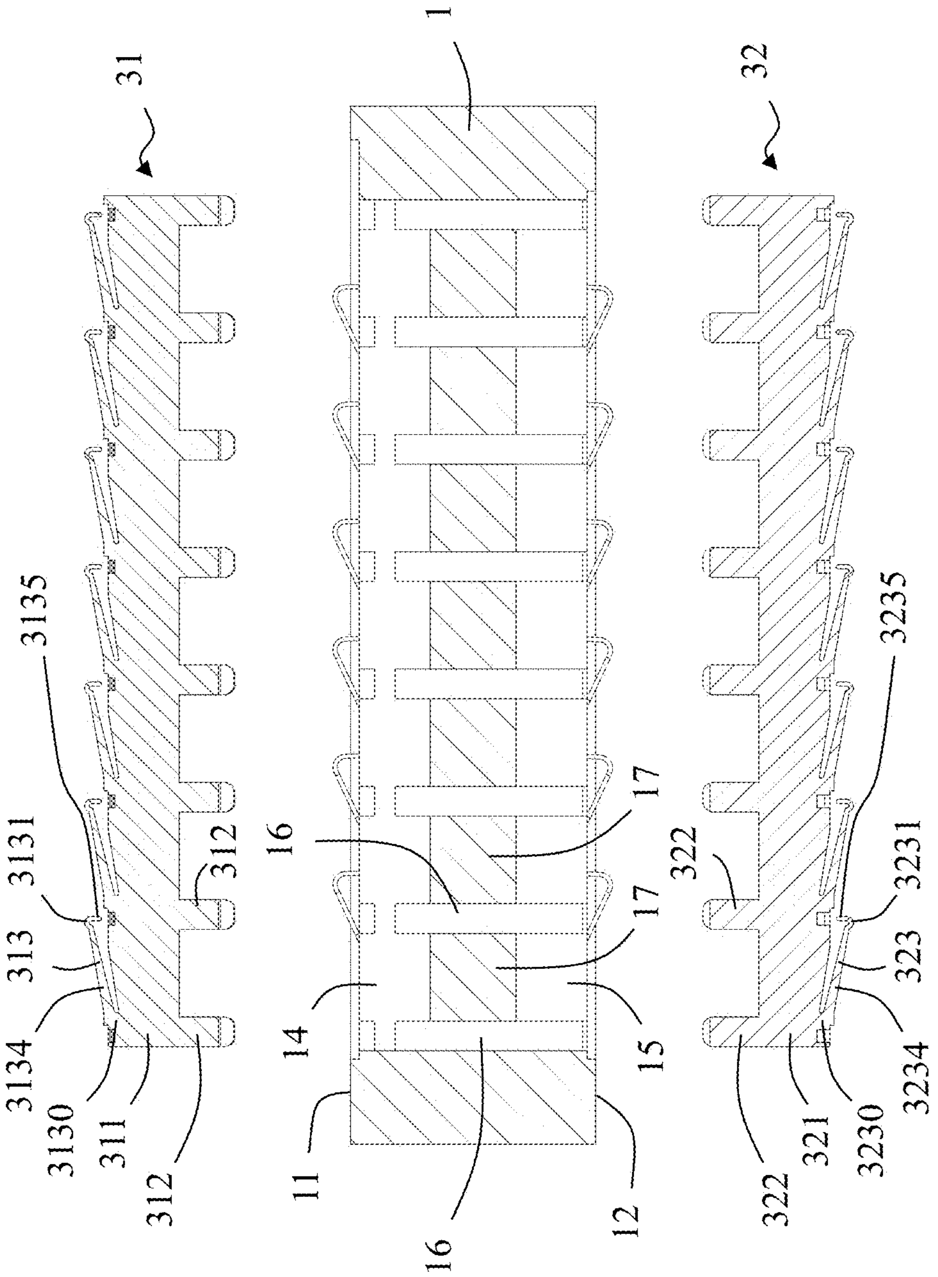
FIG. 7 is an exploded view of FIG. 6, in which a first grounding isolation sheet and a second grounding isolation sheet are separated.

Referring to FIG. 7, in the illustrated embodiment of the present disclosure, the first grounding isolation sheet 31 includes a first base portion 311 mounted in the first mounting groove 14, a plurality of first connecting arms 312 extending from the first base portion 311, and a plurality of first grounding elastic arms 313 extending from the first base portion 311. Each first grounding elastic arm 313 includes a first engaging portion 3131 protruding beyond the first mounting surface 11 and configured to be in contact with a grounding path of the first circuit board 201. The plurality of first connecting arms 312 are spaced apart along the second direction A2-A2.

Similarly, the second grounding isolation sheet 32 includes a second base portion 321 mounted in the second mounting groove 15, a plurality of second connecting arms 322 extending from the second base portion 321, and a plurality of second grounding elastic arms 323 extending from the second base portion 321. Each second grounding elastic arm 323 includes a second engaging portion 3231 protruding beyond the second mounting surface 12 and configured to be in contact with a grounding path of the second circuit board 202. The plurality of second connecting arms 322 are spaced apart along the second direction A2-A2.

When the first grounding isolation sheet 31 and the second grounding isolation sheet 32 are assembled in place, the first connecting arm 312 of the first grounding isolation sheet 31 and the second connecting arm 322 of the second grounding isolation sheet 32 are at least partially inserted into a corresponding connecting groove 16, respectively, along opposite directions. The first connecting arms 312 and the second connecting arms 322 abut against each other in a one-to-one correspondence manner, so as to connect the first grounding isolation sheet 31 and the second grounding isolation sheet 32 together in series.

Figure 10:
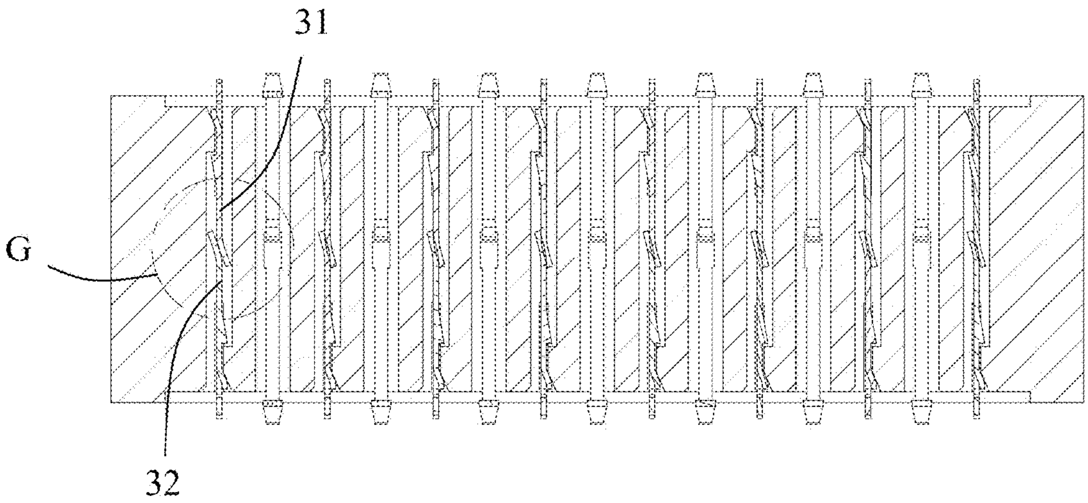
FIG. 10 is a schematic cross-sectional view taken along line F-F in FIG. 5.
Figure 11:
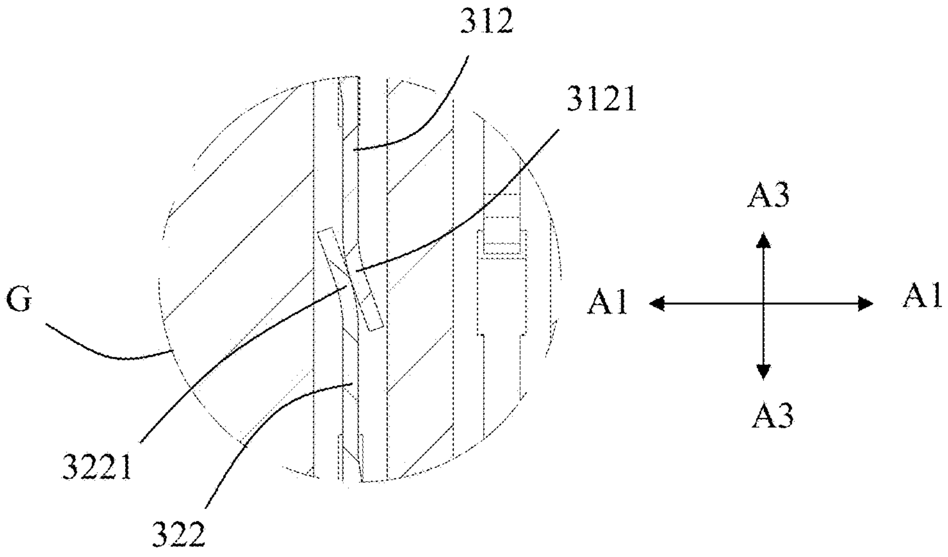
FIG. 11 is a partial enlarged view of a circled portion G in FIG. 10.
Figure 12:
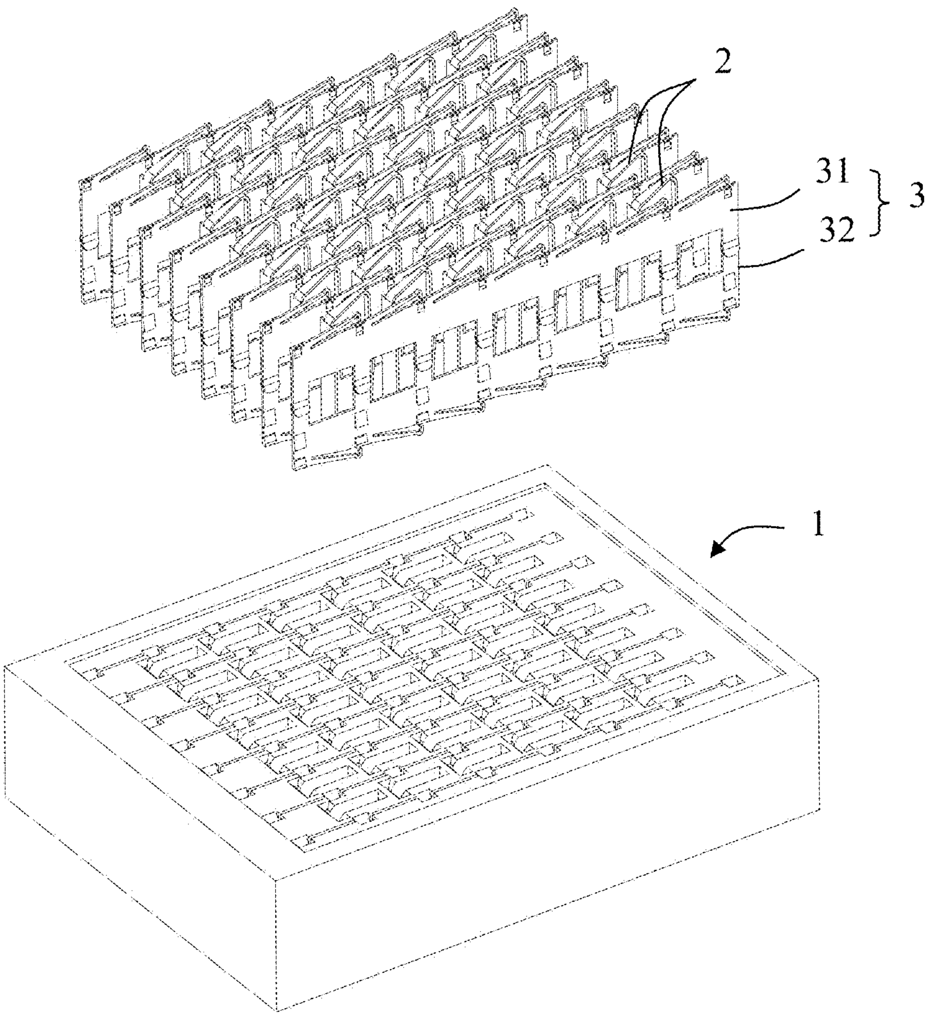
FIG. 12 is a partially exploded perspective view of FIG. 1.

In the illustrated embodiment of the present disclosure, each first connecting arm 312 is provided with a first deflection portion 3121 located at a free end of the first connecting arm 312. Each second connecting arm 322 is provided with a second deflection portion 3221 located at a free end of the second connecting arm 322. The first deflection portion 3121 deflects outward toward a side away from the second connecting arm 322. The second deflection portion 3221 deflects outward toward a side away from the first connecting arm 312. As shown in FIG. 10 and FIG. 11, the first deflection portion 3121 and the second deflection portion 3221 are in contact with each other (for example, abutting against each other) along the first direction A1-A1 in an at least partially overlapping manner. In the illustrated embodiment of the present disclosure, the first deflection portion 3121 and the second deflection portion 3221 partially overlap along a third direction A3-A3 (for example, a top-bottom direction). The third direction A3-A3 is perpendicular to the first direction A1-A1 and the second direction A2-A2. Compared with the related art, a side surface of the first deflection portion 3121 and a side surface of the second deflection portion 3221 of the present disclosure are in contact with each other, while ensuring contact reliability, it also reduces the contact force between the two, which helps improve the convenience of installation. Of course, it is understandable to those skilled in the art that the first connecting arm 312 and the second connecting arm 322 can also be in contact with each other in other ways, which will not be described in the present disclosure.

Figure 13:
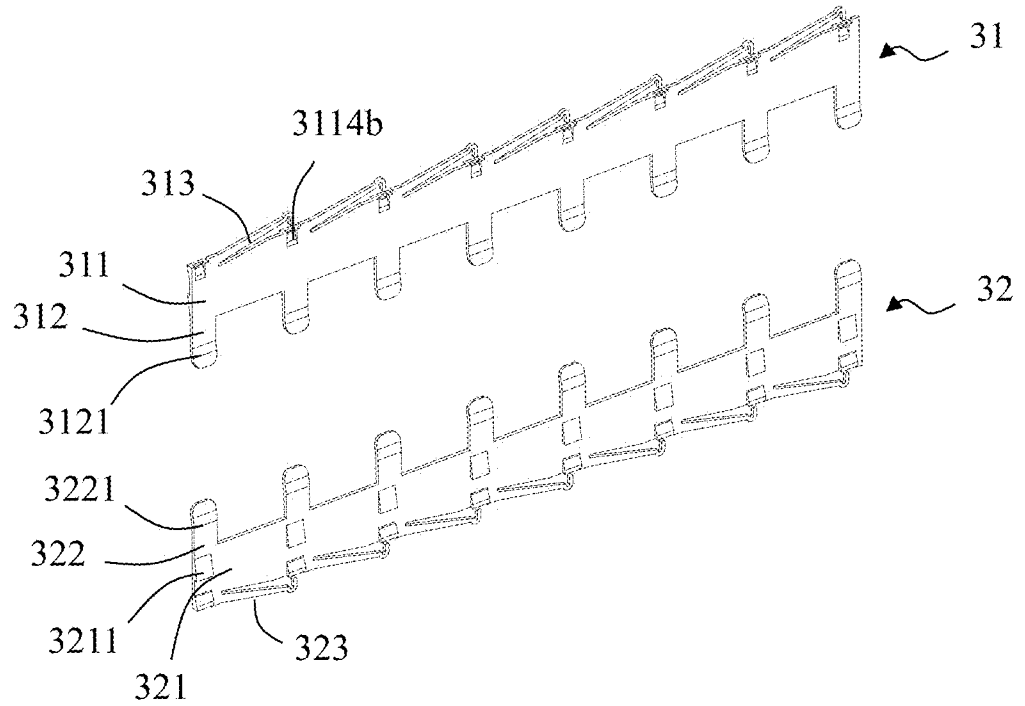
FIG. 13 is an exploded perspective view of the first grounding isolation sheet and the second grounding isolation sheet in FIG. 12.
Figure 14:
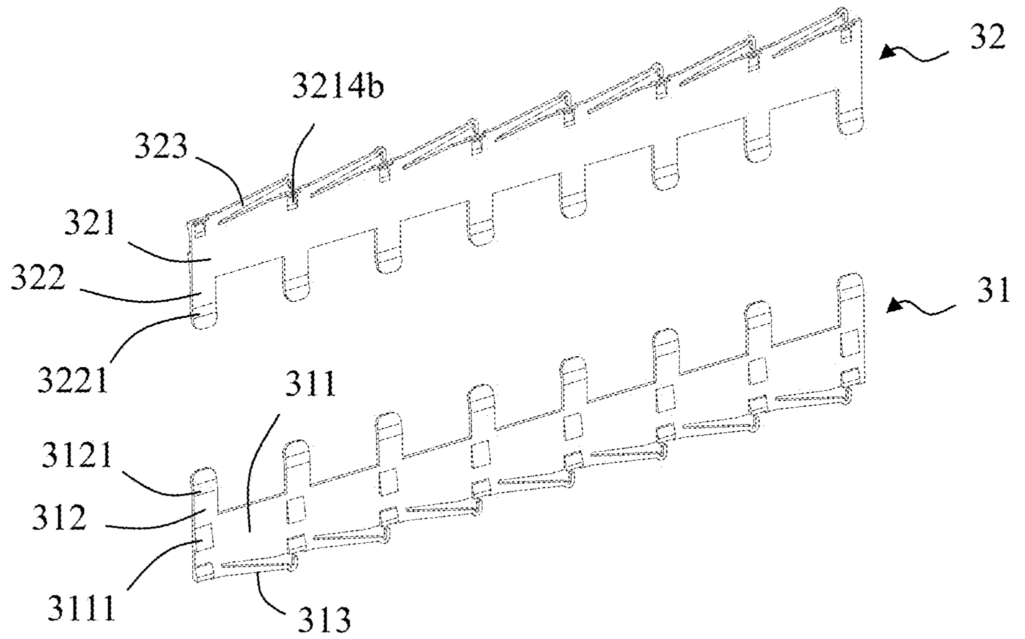
FIG. 14 is an exploded perspective view of FIG. 13 from another angle.
Figure 15:
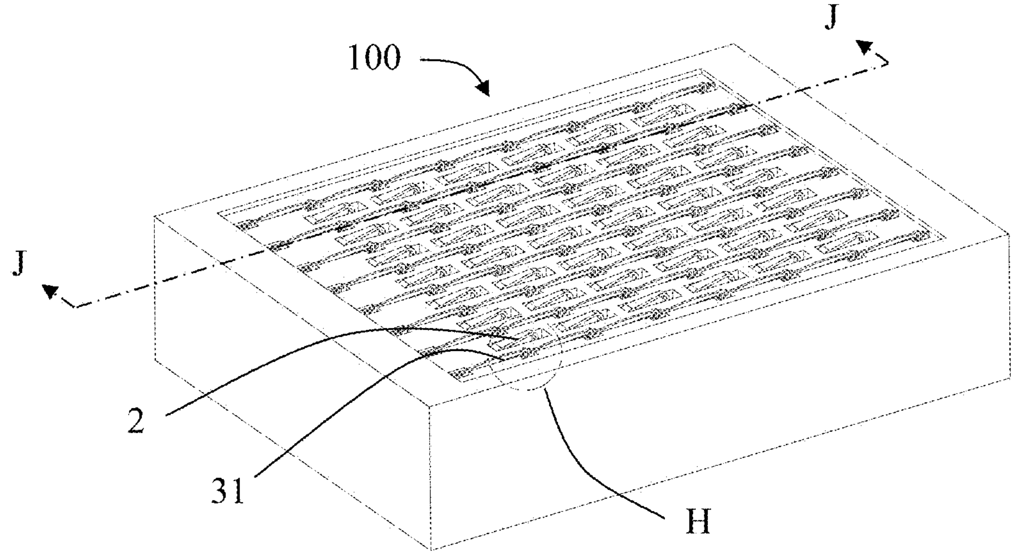
FIG. 15 is a perspective view of the board-to-board connector in the first embodiment of the present disclosure when mated with a first circuit board and a second circuit board.
Figure 16:
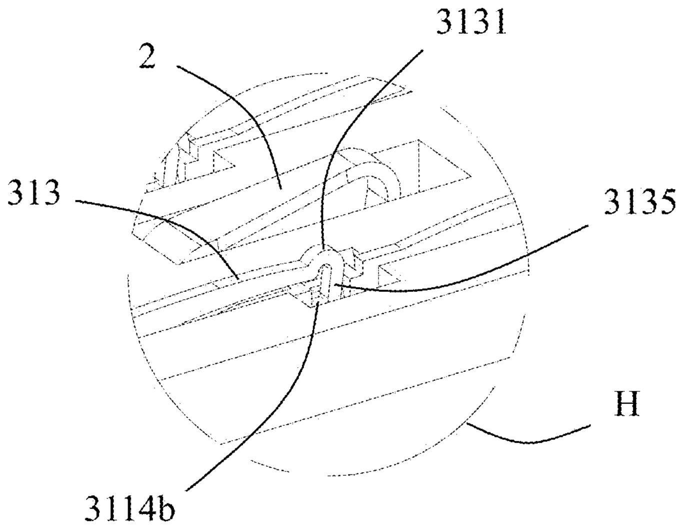
FIG. 16 is a partial enlarged view of a circled portion H in FIG. 15.
Figure 17:
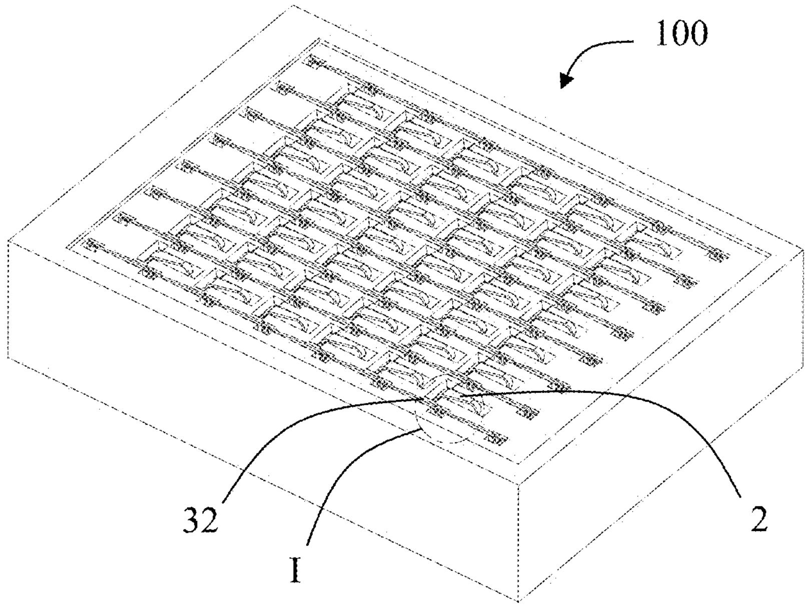
FIG. 17 is a perspective view of FIG. 15 from another angle.
Figure 18:
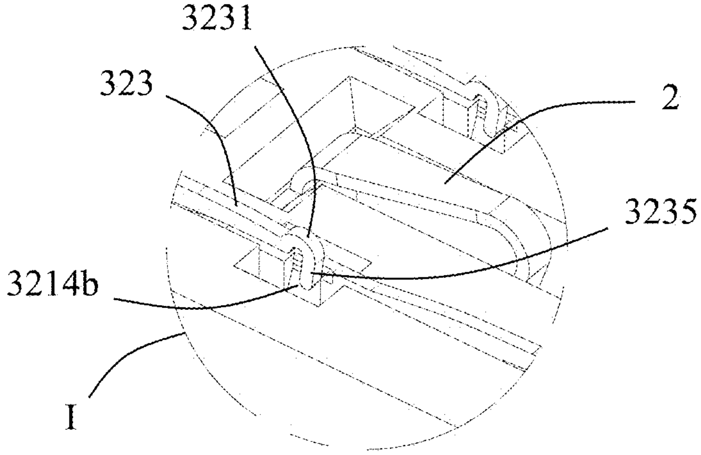
FIG. 18 is a partial enlarged view of a circled portion I in FIG. 17.

Referring to FIG. 13 and FIG. 14, in order to improve the holding force of the first grounding isolation sheet 31 and the second grounding isolation sheet 32 to the insulating body 1, the first base portion 311 is provided with a first protrusion 3111 that abuts against the insulating body 1 to fix the first grounding isolation sheet 31 to the insulating body 1. The second base portion 321 is provided with a second protrusion 3211 that abuts against the insulating body 1 to fix the second grounding isolation sheet 32 to the insulating body 1.

Figure 8:
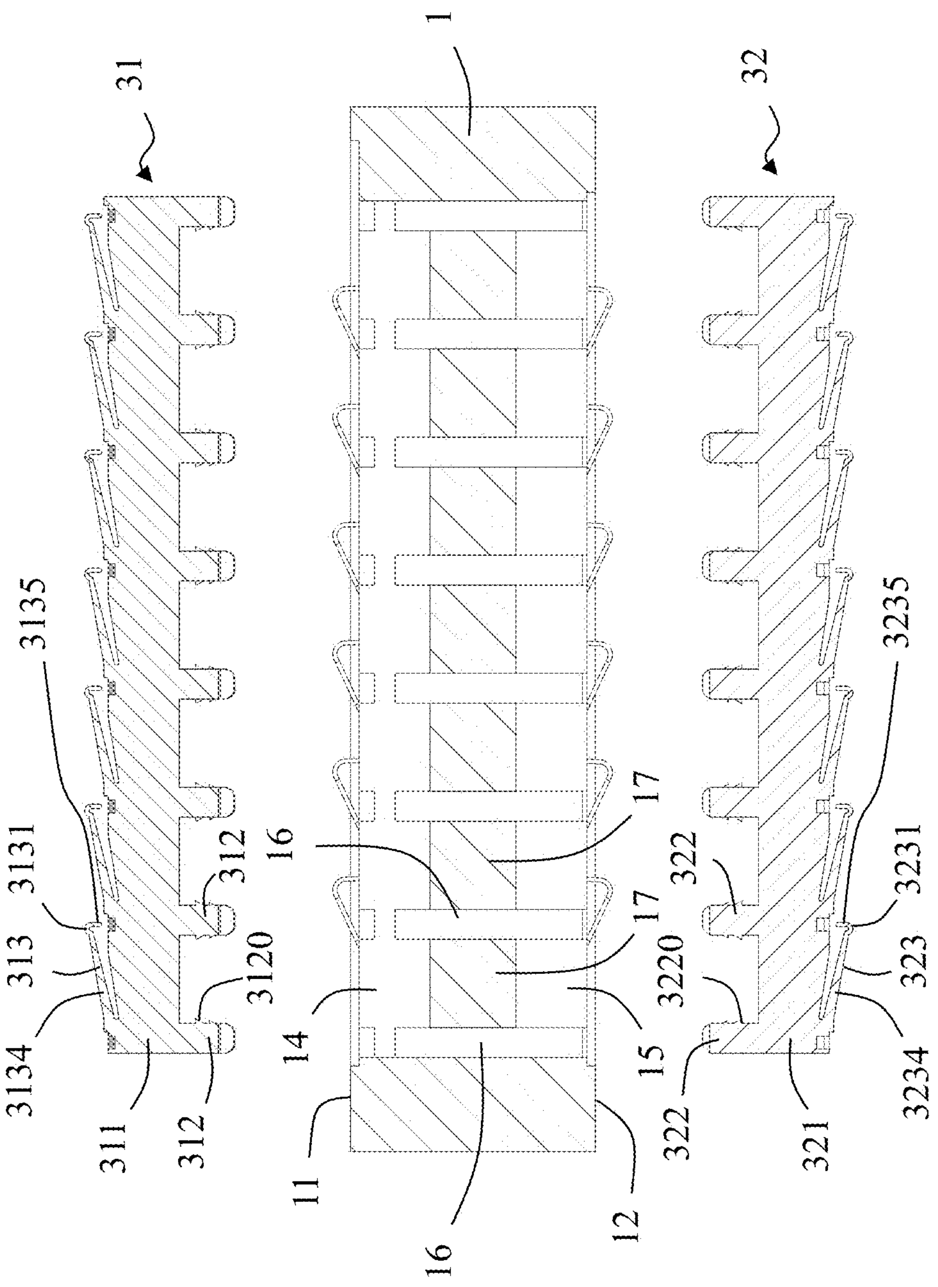
FIG. 8 is an exploded view of FIG. 7 in another embodiment.

Of course, in other embodiments, as shown in FIG. 8, the first connecting arm 312 includes a first barb 3120 that abuts against the insulating body 1 so as to fix the first grounding isolation sheet 31 to the insulating body 1. The second connecting arm 322 includes a second barb 3220 that abuts against the insulating body 1 so as to fix the second grounding isolation sheet 32 to the insulating body 1. The first barb 3120 and the second barb 3220 are inserted into the insulating body 1 to achieve fixation.

Referring to FIGS. 13 to 20, in the illustrated embodiment of the present disclosure, each first grounding elastic arm 313 is in a cantilever shape. The first grounding elastic arm 313 is always connected to the first base portion 311 via the first connecting portion 3130. When the first engaging portion 3131 of the first grounding elastic arm 313 abuts against and is in position with the first circuit board 201, the first grounding elastic arm 313 contacts the first base portion 311 through a first loop portion to generate a secondary grounding loop, thereby improving the high-frequency characteristics of the board-to-board connector 100. The first grounding elastic arm 313 includes a first arm portion 3134 and a first free end portion 3135. The first engaging portion 3131 is disposed between the first arm portion 3134 and the first free end portion 3135.

In the first illustrated embodiment of the present disclosure, the first loop portion is located at the first free end portion 3135. When the first engaging portion 3131 of the first grounding elastic arm 313 is in contact with the first circuit board 201, a first grounding loop is formed by the first grounding elastic arm 313, the first connecting portion 3130 and the first base portion 311. When the first engaging portion 3131 of the first grounding elastic arm 313 abuts against and is in position with the first circuit board 201, a side surface of the first free end portion 3135 is in contact with (for example, is overlapped with) the first base portion 311. At this time, a second grounding loop is formed through the first free end portion 3135 of the first grounding elastic arm 313 and the first base portion 311. Specifically, the first base portion 311 is provided with a first protruding portion 3112 protruding along a thickness direction of the first base portion 311. The first protruding portion 3112 defines a first groove 3113 corresponding to the first free end portion 3135 and a first contact surface 3114 exposed in the first groove 3113. When the first engaging portion 3131 of the first grounding elastic arm 313 abuts against and is in position with the first circuit board 201, the side surface of the first free end portion 3135 is in contact with (for example, is overlapped with) the first contact surface 3114.

Figure 2:
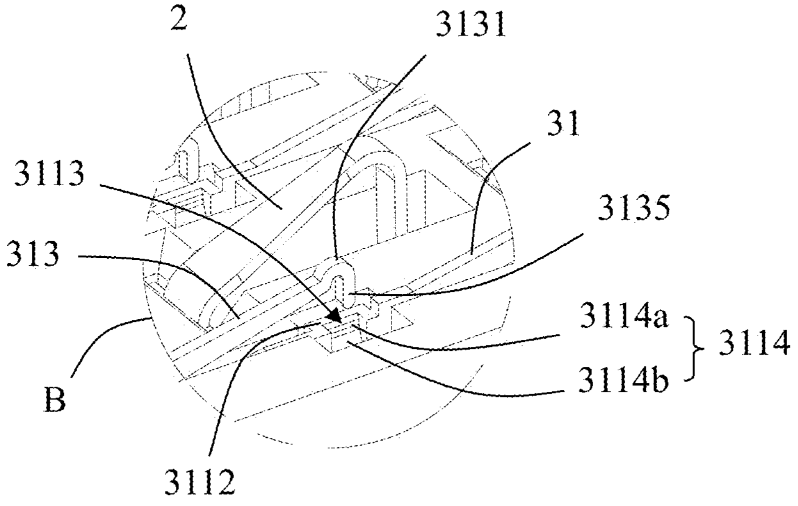
FIG. 2 is a partial enlarged view of a circled part B in FIG. 1.
Figure 3:
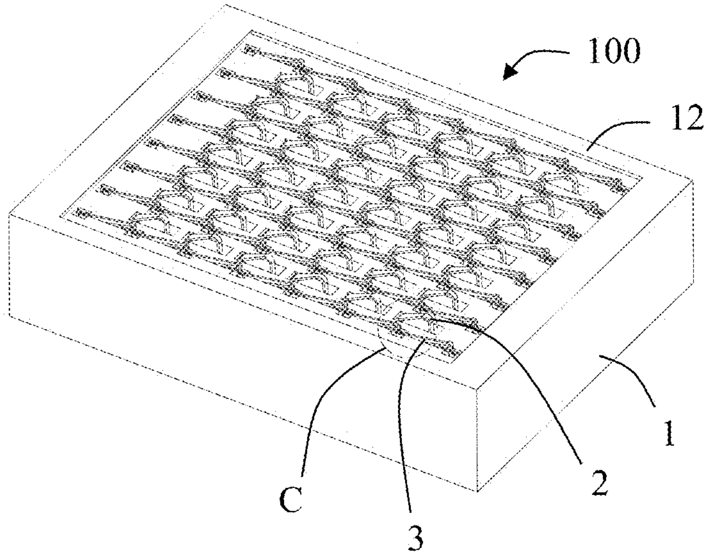
FIG. 3 is a perspective view of FIG. 1 from another angle.

Referring to FIG. 2, in the illustrated embodiment of the disclosure, the first contact surface 3114 includes a first vertical surface 3114*a* and a first inclined surface 3114*b* extending obliquely into the first groove 3113 relative to the first vertical surface 3114*a*. The first vertical surface 3114*a* is configured to guide and limit the side surface of the first free end portion 3135. When the first engaging portion 3131 of the first grounding elastic arm 313 abuts against and is in position with the first circuit board 201, the side surface of the first free end portion 3135 is in contact with (for example, is overlapped with) the first inclined surface 3114*b*. Compared with the related art, the present disclosure can improve the reliability of contact with the first free end portion 3135 by providing the first inclined surface 3114*b*. In addition, by bringing the side surface of the first free end portion 3135 into contact with (for example, is overlapped with) the first inclined surface 3114*b*, the contact force between the two is advantageously reduced.

Similarly, in the illustrated embodiment of the present disclosure, each second grounding elastic arm 323 is in a cantilever shape. The second grounding elastic arm 323 is always connected to the second base portion 321 through the second connecting portion 3230. When the second engaging portion 3231 of the second grounding elastic arm 323 abuts against and is in contact with the second circuit board 202, a first grounding loop is formed by the second grounding elastic arm 323, the second connecting portion 3230 and the second base portion 321. When the second engaging portion 3231 of the second grounding elastic arm 323 abuts against and is in position with the second circuit board 202, the second grounding elastic arm 323 contacts the second base portion 321 through a second loop portion to generate a secondary grounding loop, thereby improving the high-frequency characteristics of the board-to-board connector 100. At this time, a second grounding loop is formed by the second free end portion 3235 of the second grounding elastic arm 323 and the second base portion 321. The second grounding elastic arm 323 includes a second arm portion 3234 and a second free end portion 3235. The second engaging portion 3231 is disposed between the second arm portion 3234 and the second free end portion 3235.

In the second illustrated embodiment of the present disclosure, the second loop portion is located at the second free end portion 3235. When the second engaging portion 3231 of the second grounding elastic arm 323 abuts against and is in position with the second circuit board 202, the side surface of the second free end portion 3235 is in contact with (for example, is overlapped with) the second base portion 321. Specifically, the second base portion 321 includes a second protruding portion 3212 protruding along a thickness direction of the second base portion 321. The second protruding portion 3212 includes a second groove 3213 corresponding to the second free end portion 3235 and a second contact surface 3214 exposed in the second groove 3213. When the second engaging portion 3231 of the second grounding elastic arm 323 abuts against and is in position with the second circuit board 202, the side surface of the second free end portion 3235 is in contact with (for example, is overlapped with) the second contact surface 3214.

Figure 4:
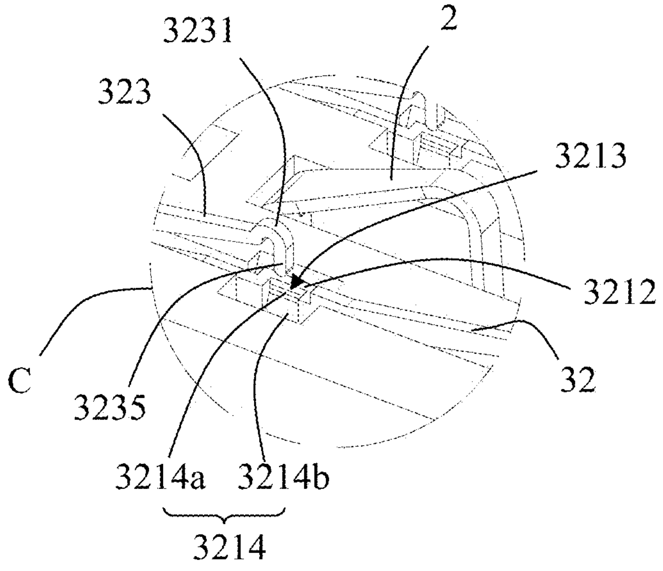
FIG. 4 is a partial enlarged view of a circled portion C in FIG. 3.

As shown in FIG. 4, in the illustrated embodiment of the present disclosure, the second contact surface 3214 includes a second vertical surface 3214*a* and a second inclined surface 3214*b* extending obliquely into the second groove 3213 relative to the second vertical surface 3214*a*. The second vertical surface 3214*a* is configured to guide and limit the side surface of the second free end portion 3235. When the second engaging portion 3231 of the second grounding elastic arm 323 abuts against and is in position with the second circuit board 202, the side surface of the second free end portion 3235 is in contact with (for example, is overlapped with) the second inclined surface 3214*b*. Compared with the related art, the present disclosure can improve the reliability of contact with the second free end portion 3235 by providing the second inclined surface 3214*b*. In addition, by bringing the side surface of the second free end portion 3235 into contact with (for example, is overlapped with) the second inclined surface 3214*b*, the contact force between the two is advantageously reduced.

Referring to FIGS. 21 to 29, in the second embodiment of the present disclosure, the first loop portion is located at the first arm portion 3134. The first base portion 311 is provided with a first recess 3116 configured to receive the first free end portion 3135 and a first abutment arm 3117 configured to engage with the first arm portion 3134. The first abutment arm 3117 is in a cantilever shape. When the first engaging portion 3131 of the first grounding elastic arm 313 abuts against and is in position with the first circuit board 201, the first arm portion 3134 is in contact with (for example, is overlapped with) the first abutment arm 3117.

Similarly, the second loop portion is located at the second arm portion 3234. The second base portion 321 is provided with a second recess 3216 configured to receive the second free end portion 3235 and a second abutment arm 3217 configured to engage with the second arm portion 3234. The second abutment arm 3217 is in a cantilever shape. When the second engaging portion 3231 of the second grounding elastic arm 323 abuts against and is in position with the second circuit board 202, the second arm portion 3234 is in contact with (for example, is overlapped with) the second abutment arm 3217.

Referring to FIGS. 30 to 35, the board-to-board connector 100 disclosed in a third embodiment of the present disclosure is similar to the board-to-board connector 100 disclosed in FIGS. 1 to 20. The main difference is that, the first protruding portion 3112 of the board-to-board connector 100 disclosed in the third embodiment of the present disclosure tears the first base portion 311 outward along the thickness direction of the first base portion 311, and the second protruding portion 3212 tears the second base portion 321 outward along the thickness direction of the second base portion 321.

Compared with the prior art, the grounding isolation sheet 3 of the present disclosure includes the first grounding isolation sheet 31 and the second grounding isolation sheet 32. The first grounding isolation sheet 31 includes the first connecting arm 312 and the first grounding elastic arm 313. The first grounding elastic arm 313 is configured to abut against the first circuit board 201. The second grounding isolation sheet 32 includes a second connecting arm 322 and a second grounding elastic arm 323. The second grounding elastic arm 323 is configured to abut against the second circuit board 202. The first connecting arm 312 is in contact with the second connecting arm 322 to connect the first grounding isolation sheet 31 and the second grounding isolation sheet 32 together in series. In this way, the grounding isolation sheet 3 of the present disclosure improves the grounding effect when it comes into contact with the first circuit board 201 and the second circuit board 202 by providing the first grounding elastic arm 313 and the second grounding elastic arm 323. Besides, the first grounding isolation sheet 31 and the second grounding isolation sheet 32, which are provided separately, facilitate assembly.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A board-to-board connector, comprising:

an insulating body including a first mounting surface and a second mounting surface opposite to the first mounting surface;

a plurality of conductive terminals disposed in at least a first row and a second row; the first row and the second row being spaced apart along a first direction; each conductive terminal including a first contact elastic arm extending beyond the first mounting surface, and a second contact elastic arm extending beyond the second mounting surface; and a grounding isolation sheet located between the conductive terminals of the first row and the conductive terminals of the second row; the grounding isolation sheet including a first grounding isolation sheet and a second grounding isolation sheet;

wherein the first grounding isolation sheet includes a first base portion mounted in the insulating body, a first connecting arm extending from the first base portion, and a first grounding elastic arm extending from the first base portion; the first grounding elastic arm includes a first engaging portion protruding beyond the first mounting surface;

the second grounding isolation sheet includes a second base portion mounted in the insulating body, a second connecting arm extending from the second base portion, and a second grounding elastic arm extending from the second base portion; the second grounding elastic arm includes a second engaging portion protruding beyond the second mounting surface;

the first connecting arm is in contact with the second connecting arm so as to connect the first grounding isolation sheet and the second grounding isolation sheet in series.

2. The board-to-board connector according to claim 1, wherein the first contact elastic arm includes a first contact portion configured to abut against a first circuit board; the second contact elastic arm includes a second contact portion configured to abut against a second circuit board; the first engaging portion is configured to abut against the first circuit board; the second engaging portion is configured to abut against the second circuit board.

3. The board-to-board connector according to claim 1, wherein the first connecting arm is provided with a first deflection portion located at a free end of the first connecting arm; the second connecting arm is provided with a second deflection portion located at a free end of the second connecting arm; the first deflection portion deflects outward toward a side away from the second connecting arm; the second deflection portion deflects outward toward a side away from the first connecting arm; the first deflection portion and the second deflection portion are in contact with each other in an at least partially overlapping manner along the first direction.

4. The board-to-board connector according to claim 3, wherein both the first row and the second row extend along a second direction; the first direction and the second direction are perpendicular to each other;

a plurality of first connecting arms are provided on the first grounding isolation sheet and are spaced apart along the second direction;

a plurality of second connecting arms are provided on the second grounding isolation sheet and are spaced apart along the second direction;

the first connecting arms and the second connecting arms are in contact with each other in a one-to-one correspondence manner.

5. The board-to-board connector according to claim 1, wherein the insulating body defines a first mounting groove extending through the first mounting surface, a second mounting groove extending through the second mounting surface, a connecting groove communicating with the first mounting groove and the second mounting groove, and a reinforced portion located between the first mounting groove and the second mounting groove;

the first base portion of the first grounding isolation sheet is mounted in the first mounting groove; the second base portion of the second grounding isolation sheet is mounted in the second mounting groove; the first connecting arm of the first grounding isolation sheet and the second connecting arm of the second grounding isolation sheet are at least partially inserted in the connecting groove.

6. The board-to-board connector according to claim 5, wherein the first base portion comprises a first protrusion that abuts against the insulating body so as to fix the first grounding isolation sheet to the insulating body; and/or the second base portion comprises a second protrusion that abuts against the insulating body so as to fix the second grounding isolation sheet to the insulating body.

7. The board-to-board connector according to claim 5, wherein the first connecting arm comprises a first barb that abuts against the insulating body so as to fix the first grounding isolation sheet to the insulating body; and/or the second connecting arm comprises a second barb that abuts against the insulating body so as to fix the second grounding isolation sheet to the insulating body.

8. The board-to-board connector according to claim 1, wherein the first row and the second row both extend along a second direction; the first direction and the second direction are perpendicular to each other;

a plurality of first grounding elastic arms are provided on the first grounding isolation sheet and are disposed at intervals along the second direction;

a plurality of second grounding elastic arms are provided on the second grounding isolation sheet and are disposed at intervals along the second direction.

9. The board-to-board connector according to claim 2, wherein the first grounding elastic arm is in a cantilever shape; the first grounding elastic arm is always connected to the first base portion via a first connecting portion;

when the first engaging portion of the first grounding elastic arm abuts against and is in position with the first circuit board, the first grounding elastic arm is in contact with the first base portion through a first loop portion.

10. The board-to-board connector according to claim 9, wherein the first grounding elastic arm includes a first arm portion and a first free end portion; the first engaging portion is disposed between the first arm portion and the first free end portion; the first loop portion is located at the first free end portion;

when the first engaging portion of the first grounding elastic arm abuts against and is in position with the first circuit board, a side surface of the first free end portion is in contact with the first base portion.

11. The board-to-board connector according to claim 10, wherein the first base portion comprises a first protruding portion protruding along a thickness direction of the first base portion;

the first protruding portion defines a first groove corresponding to the first free end portion and a first contact surface exposed in the first groove;

when the first engaging portion of the first grounding elastic arm abuts against and is in position with the first circuit board, the side surface of the first free end portion is in contact with the first contact surface.

12. The board-to-board connector according to claim 11, wherein the first contact surface includes a first inclined surface extending obliquely into the first groove;

when the first engaging portion of the first grounding elastic arm abuts against and is in position with the first circuit board, the side surface of the first free end portion is in contact with the first inclined surface.

13. The board-to-board connector according to claim 2, wherein the second grounding elastic arm is in a cantilever shape; the second grounding elastic arm is always connected to the second base portion via a second connecting portion;

when the second engaging portion of the second grounding elastic arm abuts against and is in position with the second circuit board, the second grounding elastic arm is in contact with the second base portion through a second loop portion.

14. The board-to-board connector according to claim 13, wherein the second grounding elastic arm includes a second arm portion and a second free end portion; the second engaging portion is disposed between the second arm portion and the second free end portion; the second loop portion is located at the second free end portion;

when the second engaging portion of the second grounding elastic arm abuts against and is in position with the second circuit board, a side surface of the second free end portion is in contact with the second base portion.

15. The board-to-board connector according to claim 14, wherein the second base portion comprises a second protruding portion protruding along a thickness direction of the second base portion; the second protruding portion defines a second groove corresponding to the second free end portion and a second contact surface exposed in the second groove;

when the second engaging portion of the second grounding elastic arm abuts against and is in position with the second circuit board, the side surface of the second free end portion is in contact with the second contact surface.

16. The board-to-board connector according to claim 15, wherein the second contact surface includes a second inclined surface extending obliquely into the second groove;

when the second engaging portion of the second grounding elastic arm abuts against and is in position with the second circuit board, the side surface of the second free end portion is in contact with the second inclined surface.

17. The board-to-board connector of claim 9, wherein the first grounding elastic arm includes a first arm portion and a first free end portion; the first engaging portion is disposed between the first arm portion and the first free end portion; the first loop portion is located at the first arm portion;

the first base portion comprises a first abutment arm which is in a cantilever shape and configured to engage with the first arm portion;

when the first engaging portion of the first grounding elastic arm abuts against and is in position with the first circuit board, the first arm portion is in contact with the first abutment arm.

18. The board-to-board connector according to claim 13, wherein the second grounding elastic arm includes a second arm portion and a second free end portion; the second engaging portion is disposed between the second arm portion and the second free end portion; the second loop portion is located at the second arm portion;

the second base portion comprises a second abutment arm which is in a cantilever shape and configured to engage with the second arm portion;

when the second engaging portion of the second grounding elastic arm abuts against and is in position with the second circuit board, the second arm portion is in contact with the second abutment arm.

19. The board-to-board connector according to claim 1, wherein the plurality of conductive terminals are disposed along the first direction and along a second direction perpendicular to the first direction;

a plurality of grounding isolation sheets are provided, and each grounding isolation sheet is located between two adjacent rows of the conductive terminals along the first direction.

20. The board-to-board connector according to claim 1, wherein the first grounding isolation sheet and the second grounding isolation sheet are both metal sheets, and are shared components.

* * * * *